United States Patent Office 3,218,339
Patented Nov. 16, 1965

3,218,339
PARASITICIDE
Franklin W. Short and Edward F. Elslager, Ann Arbor, Mich., assignors to Parke, Davis & Company, Detroit, Mich., a corporation of Michigan
No Drawing. Original application Mar. 24, 1959, Ser. No. 801,444, now Patent No. 3,057,776, dated Oct. 9, 1962. Divided and this application Aug. 22, 1962, Ser. No. 218,570
2 Claims. (Cl. 260—39.1)

The present invention relates to novel salts of pararosaniline and pamoic acid, to methods for their production, and to pharmaceutical compositions containing the same.

In our copending application, Serial No. 801,444, filed March 24, 1959 now issued as U.S. Patent 3,057,776, of which the present application is a division, the method for the treatment of schistosomiasis by the administration of pararosaniline or a suitable derivative thereof was disclosed.

It is an object of the present invention to provide novel pararosaniline salts having high anti-schistosomiasis activity with substantially reduced incidence of gastrointestinal side effects when compared with simple pararosaniline derivatives known to the prior art.

In accordance with the invention, this object, as well as others, which will appear hereinafter, is realized by the production of novel salts of pararosaniline with pamoic acid, otherwise known as 2,2'-dihydroxy-1,1'-dinaphthylmethane-3,3'-dicarboxylic acid.

According to the invention, the pararosaniline salts of pamoic acid can be formed by reaction of a soluble salt of pararosaniline with a soluble salt of pamoic acid, suitably in an unreactive medium such as water or an aqueous alkanol. The desired pamoate salt either precipitates from the reaction mixture, or can be obtained by concentration of the mixture, or by dilution with water or with a non-polar solvent.

In another method for the production of pararosaniline salts of pamoic acid, pararosaniline is treated with pamoic acid, suitably in an unreactive, approximately neutral solvent such as dimethylformamide or an aqueous alkanol.

The novel salts of pararosaniline and pamoic acid, which are the objects of this invention, are particularly advantageous for use in anti-schistosomal compositions. Whereas simple pararosaniline salts such as the hydrochloride do not exhibit the high degree of toxicity shown by prior art compounds used in the treatment of schistosomiasis, they nevertheless exhibit a certain degree of gastrointestinal irritation, including in some subjects vomiting, diarrhea and loss of appetite. These incidental effects of pararosaniline therapy are substantially reduced with the novel salts of the invention comprising the tris(p-aminophenyl)carbonium cation (pararosaniline cation) and an anion of pamoic acid. Such salts include bispararosaniline pamoate, a salt comprising two moles of the pararosaniline cation to one mole of the divalent pamoate anion, and pararosaniline acid pamoate, a salt comprising one mole of the pararosaniline cation to one mole of the monovalent acid pamoate anion. These salts produce an antischistosomal effect upon oral administration with a much lower incidence of gastrointestinal irritation and toxicity. Moreover, they display reduced staining properties when compared with simple pararosaniline salts such as the hydrochloride.

Further, according to the present invention, schistosomacidal compositions are produced by formulating compositions comprising a salt of pararosaniline with pamoic acid. Such compositions are constituted in dosage unit form with pharmaceutical carriers or diluents. In view of the oral activity of these salts of pararosaniline, dosage unit forms for oral administration are particularly suitable. For this purpose, the pararosaniline salt can be incorporated into tablets, powders, capsules, solutions, suspensions and similar forms. The medicament can be incorporated with pharmaceutically acceptable solid or liquid diluents. Solid carriers and diluents are particularly suitable for use and include sugars such as lactose and sucrose; cellulose derivatives such as sodium carboxymethyl cellulose, ethyl cellulose, methyl cellulose and cellulose acetate phthalate; gelatin (including hard and soft gelatin capsules); talc; corn starch, stearic acid and magnesium stearate. Liquid carriers and diluents suitable for use include vegetable oils such as peanut oil, cottonseed oil, seasame oil, olive oil, corn oil, and oil of theobroma; polyethylene glycol; propylene glycol; glycerin; sorbitol; ethanol and water. Suitable preservatives and flavoring agents can also be incorporated in such compositions. In the production of dosage forms such as tablets, the use of an enteric coating or a sugar coating is also useful in minimizing a tendency toward nausea or staining. If administration by a parenteral route is desired, the medicament can also be prepared in solution or suspension in ampoule form by admixture with a liquid diluent. Other therapeutic agents can also be incorporated with the pararosaniline salt in these compositions.

The percentage of the pararosaniline salt in the compositions can be varied within wide limits, but, for practical purposes, is preferably present in a concentration of at least 5%. The most satisfactory compositions are those in which a much higher proportion of the pararosaniline salt is present.

In the preparation of dosage unit forms such as tablets and capsules the quantity of medicament furnished by each individual tablet or capsule is selected such that the proper total daily dose, falling within the range of approximately 0.5 to 4.0 g. (calculated as pararosaniline cation equivalent), can be reached by administering either one or a reasonable number of the tablets or capsules. For convenience in manufacturing and ease of administration, it is preferable that such dosage forms contain at least 50 mg. and up to 500 mg. of pararosaniline compound (calculated as pararosaniline cation equivalent) per unit.

As previously indicated, the substances and compositions of the invention are orally effective in the treatment and prophylaxis of schistosomiasis. They are active against immature as well as mature schistosomes, whereas certain prior art materials have been reported ineffective against immature worms. Moreover, the substances and compositions of this invention are effective against other trematodes. They are useful in the treatment of paragonimiasis, effecting a strong inhibition in the production of ova in the latter disease.

The invention is illustrated by the following examples:

*Example 1*

A mixture of 235 g. of pararosaniline hydrochloride (containing 1.8% of water) and 160 g. of disodium pamoate monohydrate in 3 liters of methanol is heated and stirred for 3 hours and then filtered slowly with vigorous stirring into 15 liters of water. The insoluble product is washed with water and dried in vacuo at 50–60° C. The product obtained in this manner is hydrated bispararosaniline pamoate, a salt comprising two moles of the tris(p-aminophenyl)carbonium cation (pararosaniline cation) to one mole of the divalent pamoate anion; M.P. about 220–225° C.

*Example 2*

A filtered solution of 11.5 g. of pararosaniline hydrochloride in 200 ml. of water heated to the boiling point is added to a hot, filtered solution of 8.0 g. of disodium pamoate monohydrate in 100 ml. of water. The gummy product which precipitates solidifies on cooling and is collected on a filter. It is resuspended in water, again collected and then dried in vacuo at 50° C. This compound is hydrated bispararosaniline pamoate, substantially identical with the product of the preceding example.

*Example 3*

To a hot, filtered solution of 3.88 g. of pamoic acid in 150 ml. of N,N-dimethylformamide is gradually added a solution of 6.10 g. of pararosaniline in 100 ml. of hot N,N-dimethylformamide. The resulting deeply-colored solution is heated for one hour at 90–100° C. and then poured with stirring into 1 liter of cold water. The insoluble product is collected on a filter, washed with water and dried in vacuo. This compound is dark-green bispararosaniline pamoate, substantially identical with the product of the preceding examples.

*Example 4*

To a hot, filtered solution of 3.88 g. of pamoic acid in 125 ml. of N,N-dimethylformamide is added a solution of 3.05 g. of pararosaniline in 50 ml. of hot N,N- dimethylformamide. A dark-red solution which results is heated for one hour at 90–100° C. and then poured with vigorous stirring into 2 liters of cold water. The reddish-brown product is collected on a filter, washed well with water and dried in vacuo at 45° C. Purification by recrystallization from methanol affords pararosaniline acid pamoate, a salt comprising one mole of the tris(p-aminophenyl) carbonium cation (pararosaniline cation) to one mole of the monovalent acid pamoate anion; M.P. 205–210° C.

*Example 5*

A batch of hydrated bispararosaniline pamoate is prepared for tableting by treating it with 1% of mineral oil in order to minimize dust formation. This product (1828 g.) containing 7.5% of water and 1% of mineral oil is blended with 800 g. of sifted corn starch and the mixture wet granulated with a 10% w./w. solution of 176 g. of sifted corn starch in distilled water. After the granulation has been dried and reduced, there are blended in 80 g. of sifted talc, 280 g. of sifted corn starch and 14 g. of magnesium stearate. The mixture is then compressed on a tableting machine to provide about 9500 tablets, each containing approximately 100 mg. of pararosaniline cation equivalent. If desired, a light sugar coating is applied.

A quantity of pararosaniline acid pamoate affording an equal amount of pararosaniline cation can be substituted for the bispararosaniline pamoate in the foregoing procedure.

We claim:
1. Pamoic acid salt of pararosaniline.
2. Bispararosaniline pamoate.

References Cited by the Examiner

UNITED STATES PATENTS

| | | | |
|---|---|---|---|
| 2,641,610 | 6/1953 | Barber | 260—501 |
| 2,731,470 | 1/1956 | Elslager | 260—295 |
| 2,925,417 | 2/1960 | Elslager | 260—240 |
| 3,067,242 | 12/1962 | Larrabee | 260—501 |

FOREIGN PATENTS 744,281   2/1956   Great Britain.

OTHER REFERENCES

Deschiens, Chem. Abst., vol. 39, p. 2566(3), 1945.
Osol, Dispensatory of U.S., 1955, Part 1, p. 591.
Steck, J.A.C.S., vol. 70, p. 1012–1015.
Steck, J. A. Pharm. Assoc., Second Edition, vol. 41, p. 455.

JULIAN S. LEVITT, *Primary Examiner.*

MORRIS O. WOLK, *Examiner.*